(No Model.)
C. W. WYNN.
ANTIFRICTION BEARING.
No. 496,242. Patented Apr. 25, 1893.
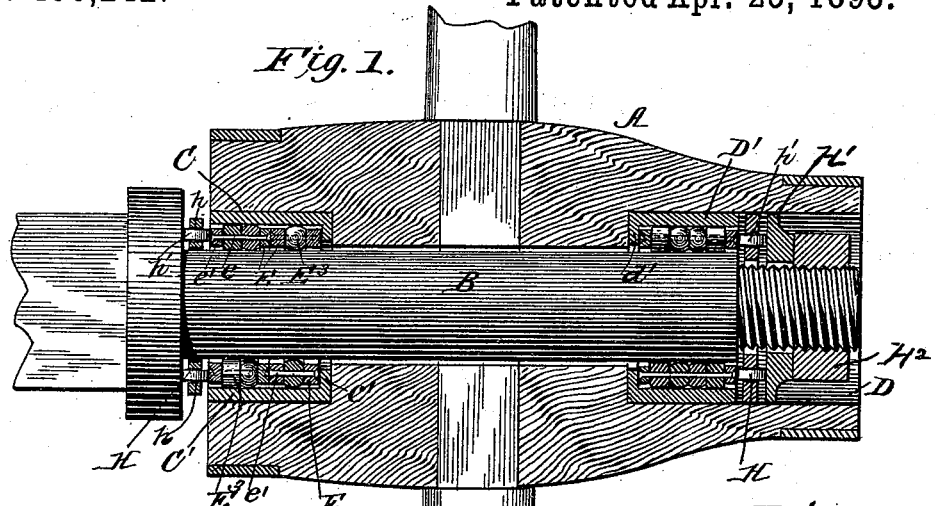
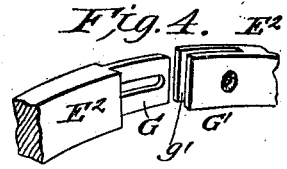
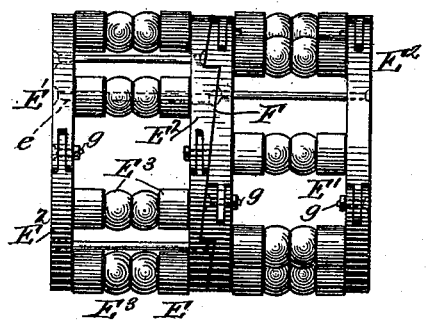
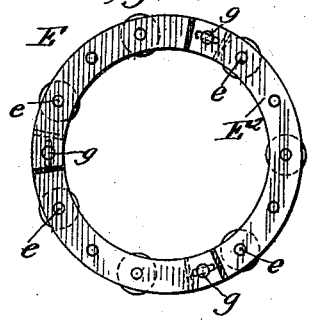
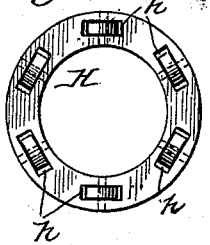
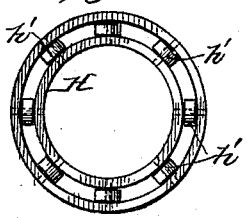
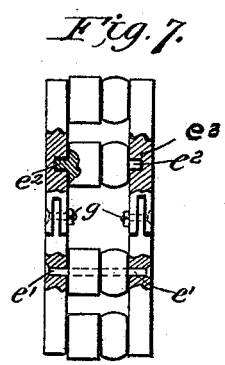
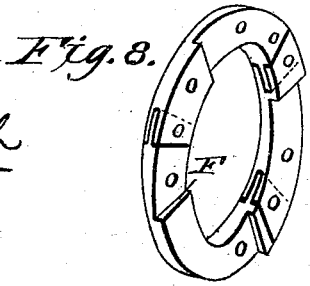
WITNESSES:
Fred G. Dieterich
P. B. Turpie
INVENTOR
C. W. Wynn.
BY Munn
ATTORNEYS.

UNITED STATES PATENT OFFICE.

CHARLES WASHINGTON WYNN, OF ASHEVILLE, NORTH CAROLINA.

ANTIFRICTION-BEARING.

SPECIFICATION forming part of Letters Patent No. 496,242, dated April 25, 1893.

Application filed November 7, 1892. Serial No. 451,179. (No model.)

*To all whom it may concern:*

Be it known that I, CHARLES WASHINGTON WYNN, of Asheville, in the county of Buncombe and State of North Carolina, have invented a new and useful Improvement in Antifriction-Bearings, of which the following is a specification.

My invention is an improvement in antifriction bearings and consists in the novel construction and combination of parts hereinafter described and pointed out in the claims.

In the drawings—Figure 1 is a sectional view of my improvement embodied in a wheel hub and axle provided with my improvements. Fig. 2 is a side elevation of two cages united according to my invention. Fig. 3 is an end view of one of the cages. Fig. 4 is a detail perspective illustrating the connection between two of the ring sections of the cage. Figs. 5 and 6 are face views of different forms of rings for bearing the end thrust. Fig. 7 is a side view of a modification of a cage partly broken away in section. Fig. 8 is a detail view of one of the rings of the cage. Fig. 9 shows the construction for adapting a tapered spindle to receive a cage having a uniform cylindrical interior.

In the construction shown the hub A is bored to receive the spindle B and has its bore at its inner and outer ends respectively enlarged at C and D to receive the inner and outer box as presently described.

Boxes C' and D' are driven in the enlarged bore sections C and D and preferably have at their inner ends inwardly projecting flanges $c'$, $d'$ as shown. It will be seen that the boxes do not extend past the middle portion of the hub so that I am able to leave at such middle portion the maximum amount of wood, the bore at such point being only sufficiently large to permit the passage of the spindle. This enables me to form deep sockets for the spokes permitting the same to be firmly seated in the hub. This will be clearly understood from Fig. 1.

The roller cages E are in the form of circular frames E' having end rings $E^2$, between and to which are journaled the rollers $E^3$, which have central openings for the shafts $e$ which support them. These shafts $e$ may extend entirely through the end rings $E^2$ as shown at $e'$ or they may be seated at their ends in sockets formed in the inner faces of the end rings as shown at $e^3$ in Fig. 7. In this Fig. 7 the shaft at $e'$ is shown as headed so that it operates as a locking connection between the end rings, the separate connecting rods being omitted in said Fig. 7. These rollers may be round or in the shape of balls or may be made flat faced both the forms being shown or the two forms of rollers may be used together. It is much preferred to make the rollers with round and flat faces of equal diameters so that they will bear evenly within the cylindrical bore of the hub. This formation of the rollers with flat and round faces reduces the surface bearing of the roller, secures the combined advantages of cylindrical and ball rollers, and results in an easy, smooth, and quiet operation of the bearing. It may be desirable to manufacture the cages, some with one roller, some with two, and some with three or more for convenience in applying the improvement to spindles of different lengths, and where two or more rollers are used I prefer to employ both the round and flat faced rollers in equal proportions. This will be understood from Fig. 2 in which I show each shaft with four rollers, two flat faced and two round.

In Fig. 1 I show two cages in the inner bore section and one in the outer bore section. Where two or more of the cages are used abutting each other I prefer to lock them together. To this end I form the abutting faces with interlocking formations at F and fit them together. When so fitted they may be secured rigidly together by screws, not shown, or in other suitable manner. In so securing the cages I place the roller shafts of one out of line with those of the other, setting them on lines midway between those of the others as most clearly shown in Fig. 2.

To permit the use of the same cages on spindles of different sizes I form them to contract and expand so that they may be compressed to fit a small spindle or expanded or spread to fit a larger one. This is accomplished by making the rings $E^2$ in sections having at their junctures overlapping slip portions G G' united by a screw or pin $g$. This construction specifically consists in forming the slip portion G of one section as a tenon and fitting such tenon in a mortise $g'$ in the meeting end of the next section and passing the pin g through, the opening for the pin being slotted in one of the parts G G' to permit them to slide upon each other and yet hold them from becoming separated. Manifestly this construction which is best shown in Fig. 4 permits the convenient adjustment of the cages to fit spindles of different sizes.

While I have shown in Fig. 1 two cages at the inner end of the hub and one cage at the outer end I do not desire to be limited thereto as the number and arrangement of the cages may be varied according to circumstances or the wish of the user and when desired or necessary the cages may be made or multiplied to extend from end to end of the hub, or one or more cages may be arranged at each end of the hub and the space between be filled with ordinary washers or other suitable filling.

At one or both ends of the hub I prefer to employ the end rings H, which may be formed, as shown in Figs. 1 and 5 of single rings having openings $h$ in which the rollers $h'$ are journaled or said rings H may be formed with inner and outer rings separated and receiving the rollers $h'$ between them as shown in Fig. 6. These rings take up the end thrust and operate to ease the movement of the wheel.

The improvements are shown in Fig. 1 in connection with a straight spindle and that is preferred but it is obvious that the improvements may be readily adapted for use on a tapered spindle, or the latter may be covered to adapt it to receive the cages such as shown in Fig. 1. To this end a cover tube I such as shown in Fig. 9, having tapered bore and straight exterior, may be fitted on the tapered spindle to form it into a straight spindle, as will be readily seen from said figure.

It will be understood that my improvements may be used on a revolving axle as well as on a fixed axle the cages being in such case fitted in the box. Also the use of the rollers avoids the necessity of using oil and thus prevents the loosening of the spokes by the hub becoming saturated with oil. Where two cages are arranged side by side, the roller of one alternating with those of the other, the weight will be borne first by one and then by the other.

By the cages revolving on the spindle and distributing the wear the wearing of the spindle flat on one side is avoided. Obviously the improvements may be applied to pulley blocks, falls &c., the axle or spindle forming the shaft and the hub or the fixed box forming the box in which the shaft fits, the cages being interposed between the shaft and box.

The end thrust rings H are arranged at the opposite end of the shaft or box the inner one abutting the axle shoulder and the outer one against a face plate H' held by the securing nut $H^2$ turned on the end of the threaded stem.

It will be noticed in Fig. 1 that the rollers $h'$ of the rings H bear directly against the cages E.

Having thus described my invention, what I claim as new, and desire to secure by Letters Patent, is—

1. An anti-friction bearing comprising a plurality of cages united together at their abutting ends and having at such ends interlocking projections substantially as set forth.

2. In an anti-friction bearing substantially as described, a cage provided with circumferentially adjustable end rings, and provided between said rings with rollers having round and flat faces of equal diameters, whereby they will bear evenly within a cylindrical bore, substantially as set forth.

3. An anti-friction bearing substantially as described, comprising a plurality of cages each having longitudinally disposed rollers and provided at their meeting ends with interlocking projections arranged with respect to the rollers, substantially as described, whereby the rollers of each cage will be in line between those of the next cage substantially as set forth.

CHARLES WASHINGTON WYNN.

Witnesses:
J. L. CATHEY,
J. McD. WHITSON.